No. 884,569. PATENTED APR. 14, 1908.
N. H. CEDERQUIST.
DUST PROOF KNOCKDOWN SHOW CASE.
APPLICATION FILED MAY 20, 1907.
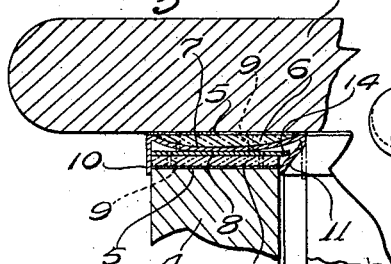
Fig. 1.
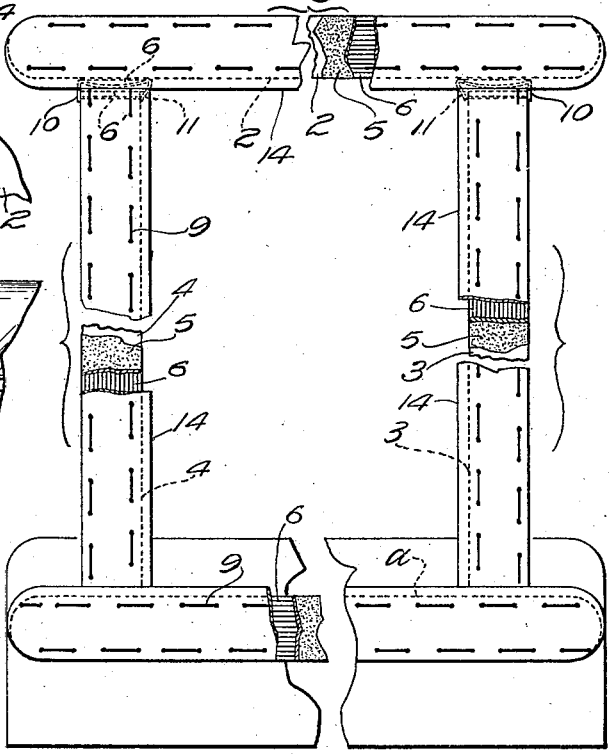
Fig. 2.
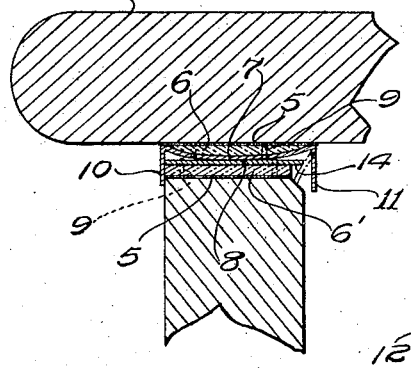
Fig. 3.
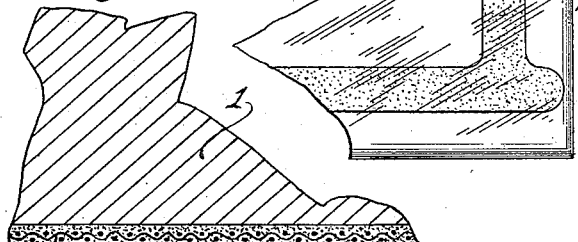
Fig. 4.
Fig. 5.
Fig. 6.
Inventor:
Nils Herman Cederquist
by James R. Townsend
his Atty
Witnesses:
F. N. Kirkby
J. Townsend
THE NORRIS PETERS CO., WASHINGTON, D. C.

UNITED STATES PATENT OFFICE.

NILS H. CEDERQUIST, OF LOS ANGELES, CALIFORNIA.

DUST-PROOF KNOCKDOWN SHOW-CASE.

No. 884,569.    Specification of Letters Patent.    Patented April 14, 1908.

Application filed May 20, 1907. Serial No. 374,760.

*To all whom it may concern:*

Be it known that I, NILS HERMAN CEDERQUIST, a citizen of the United States, residing at Los Angeles, in the county of Los Angeles and State of California, have invented a new and useful Dust-Proof Knockdown Show-Case, of which the following is a specification.

This invention relates to show-cases composed largely of plate-glass, and includes a novel glass-connecting joint by means of which a plate of glass can be firmly, rigidly and detachably secured to the edge of one, or the edges of more than one sheet of plate glass.

In the construction of show-cases, several important requirements are to be considered. For instance:—(1) It is desirable that the joints shall be as unobtrusive as possible, and that they may be made ornamental if desired; (2) that the glass plates shall be positively and firmly attached to each other in a way that is practically permanent; (3) that the joint between the plates of glass shall be perfectly closed against the admission of dust; (4) that there shall be a cushion between the plates of glass so that different degrees of contraction or expansion of said different plates of glass will not operate to break any of them; (5) that the joint may be readily made by the workman at the place at which the show-case is to be erected; and (6) that the plates of glass may be detached from each other when it is desired to knock down the show-case for transportation or repair.

An object of this invention is to provide means whereby all of these advantages are secured in a thoroughly satisfactory manner with a minimum width of space intervening between the bodies.

Another object of the invention is to provide between plates of glass a cheap, practical readily applied permanent joint having a detachable metallic connection.

The accompanying drawings illustrate the invention in a form I at present deem preferable.

Figure 1 is an exaggerated, fragmental, sectional view of a dust-proof knock-down show-case embodying this invention which shows the top plate and two side plates of the show-case. Dotted lines indicate the position of a wall of one of the metallic strips before the same is bent into fastening position. Fig. 2 is a fragmental plan of the front, back and ends of the show-case from which the glass top has been removed. Fig. 3 is a fragmental view of the under-side of the top of a show-case embodying this invention. Fig. 4 is a fragmental plan view of a show-case embodying this invention. Fig. 5 is a fragmental section corresponding to Fig. 1, excepting that the upright plate of glass is shown of greater width than in Fig. 1, and is beveled at its upper edge so that the joint for the same will be uniform with that shown in Fig. 1. Furthermore, the joint is shown as in position for final finishing. Fig. 6 is a fragmental, exaggerated cross-section of the film for covering the joint.

In the drawings, 1, 2, 3, 4 designate plates of glass of which the show-case is constructed; 1 being the top plate, 2 the front plate, and 3 and 4 end plates.

*a* designates the back rail.

5 designates films composed of some suitable cement which will fasten glass and leather or some other tough yielding cushioning material together.

6 and 6′ designate tough yielding cushion strips of two different forms, each of said strips being fastened to a glass plate by means of the tenaceous films 5, of cement that will adhere to glass and to such cushion material.

7 and 8 designate two strips of malleable bendable metal and 9 designates fastening means by which the strips are respectively fastened to their respective tough yielding cushioning strips 6 and 6′. The fastening means 9 may be of any suitable form extending through the yielding cushioning material 6 or 6′, and the metallic strips 7 or 8 as the case may be, in the joints which I deem most preferable, for the reason that they are constructed with great ease and rapidity, the fastening means 9 consist of stitches of thread which are made by simply sewing the tough cushion strip and the metal strip together. Such sewing may be readily accomplished by the use of a sewing machine.

The metal strips are of different widths, one being constructed to form a socket in which the other shall seat, and said other strip being of a width slightly greater than the thickness of the edge of the plate of glass to which such other strip is to be secured; the latter strip being the one permanently secured to the edge of its plate as distinguished from the flat face of the plate to which the first mentioned strip is secured.

The metal which I prefer to employ for the strips 7 and 8, is aluminium, and said strips are as thin as practicable consistent with the requisite strength of the joint when the show-case is put together.

The strip which is designed to be fastened to the flat side of the plate of glass is formed as a trough having two walls as 10 and 11, the intermediate portion between said walls being preferably dished or bent longitudinally to form a concavity along and in which the strip 6 may be embedded. Said groove, inward bend or trough of such portion, which appears clearly in Fig. 1, is sufficient to receive the tough cushion 6 which is to be fastened to the flat side of the plate 1.

When the strips 7 and 8 and the strips 6 and 6' have been formed of the length and width required, the strips 6 and 7 will be sewed together by one or two rows of stitching and then the strips 7 may be bent longitudinally to form the walls 10 and 11 which will be allowed to stand practically at right angles to the intermediate portion of said strip. The strips 6' and 8 will be sewed together in the same fashion as the strips 6 and 7, and thereupon they will be ready to be fastened to the plate glass.

In order to form a tenacious lasting film for covering the metallic joint I coat the glass at the place the joint is to be made with a composition of suitable yielding waterproof cement and some commercial metallic bronzing or silvering substance in the form of a powder, and I embed therein a strip 12 of soft, very thin open mesh cloth, as cheese cloth, for instance. When the cement is thoroughly dry the cushion side of a metal strip will be cemented to the film with some good water-proof cement. When thoroughly dry the glass plates will thus be respectively furnished with metallic strips adapted to engage each other and when the same have been brought together one wall 11 of the channeled strip 7 can be bent over upon the projecting edge 14 of the flat strip, thus to form a lock and hold the metal strip or plates together. The walls thus bent over are preferably inside the show-case and the other walls 10 of the metal strip are flush with the outside face of the glass plate which is to be fastened thereby.

I claim:—

1. A glazier's joint comprising two structural bodies, two interlocking metal bodies, two yielding tough bodies fastened directly to said metal bodies respectively and two tough yielding bodies cemented to said yielding tough bodies and to the structural bodies respectively.

2. A glazier's joint comprising two structural bodies one having a flat side and the other an edge to be fastened thereto, a metal strip fastened to said flat side and formed as a trough having two walls, the intermediate portion between said walls being dished or bent longitudinally to form a cavity along and in which a strip may be embedded to effect such fastening.

3. A glazier's joint comprising two sheets of glass, two metal strips of different widths, one being constructed to form a socket in which the other shall seat and said other strip being of a width slightly greater than the thickness of the edge of the plate of glass to which such other strip is to be secured; the latter strip being the one permanently secured to the edge of its plate as distinguished from the flat face of the plate to which the first mentioned strip is to be secured.

In testimony whereof, I have hereunto set my hand at Los Angeles California this 8th day of May 1907.

NILS H. CEDERQUIST.

In presence of—
JAMES R. TOWNSEND,
M. BEULAH TOWNSEND.